United States Patent [19]

Ho et al.

[11] Patent Number: 4,904,717

[45] Date of Patent: Feb. 27, 1990

[54] ALIPHATIC THIO ADDITIVE FOR POLYCARBONATE

[75] Inventors: Thoi H. Ho; Charles O. Mork, both of Lake Jackson; Samuel A. Ogoe, Missouri City; Jeffrey E. Lackey, Lake Jackson, all of Tex.

[73] Assignee: The Dow Chemical Company, Midland, Mich.

[21] Appl. No.: 313,929

[22] Filed: Feb. 22, 1989

[51] Int. Cl.$^4$ .............................................. C08K 5/37
[52] U.S. Cl. .................................................... 524/392
[58] Field of Search ................ 524/392, 312, 313, 291

[56] References Cited

U.S. PATENT DOCUMENTS

| | | | |
|---|---|---|---|
| 3,010,937 | 11/1961 | Roos et al. | 524/392 |
| 3,186,961 | 6/1965 | Sears | 524/611 |
| 3,305,520 | 2/1967 | Fritz et al. | 524/151 |
| 3,729,443 | 4/1973 | Petorli et al. | 524/333 |
| 4,041,003 | 8/1977 | Adelmann et al. | 524/611 |
| 4,082,808 | 4/1978 | Hay | 568/48 |
| 4,123,436 | 10/1978 | Holub et al. | 524/611 |
| 4,303,759 | 12/1981 | Dixon et al. | 524/611 |

OTHER PUBLICATIONS

Braksmayer, "Antioxidant Synergist Cuts Odor, Protects Color", 66, Modern Plastics, 122–125, (Jan. 1989).

*Primary Examiner*—Veronica P. Hoke
*Attorney, Agent, or Firm*—John A. Langworthy

[57] ABSTRACT

A composition of matter, being an admixture of polycarbonate and an aliphatic thio compound, molded articles of which release cleanly from, and without adhesion to, a mold.

20 Claims, No Drawings

ALIPHATIC THIO ADDITIVE FOR POLYCARBONATE

BACKGROUND OF THE INVENTION

This invention relates to compositions which contain polycarbonate and an aliphatic thio compound: and, in particular, it relates to articles which, when molded from such compositions, do not exhibit surface defects upon release from a mold.

Polycarbonate has found many uses because, in general, it combines a high level of impact resistance, tensile strength, heat resistance and dimensional stability. However, in some instances in which it is being injection molded at high speeds, the article being molded suffers from a tendency to fail to cleanly release from a mold upon the completion of molding. Such unwanted adhesion, or "sticking", to a mold frequently leaves a molded article with noticeable surface defects, herein sometimes called "stick marks". Accordingly, it would be desirable to protect articles molded from polycarbonate from the occurrence of such surface defects by forming such articles from a polycarbonate composition prepared by admixing polycarbonate with a substance which promotes clean release from a mold with no adhesion thereto. It would be particularly desirable to utilize, in the formation of such a composition, a substance which not only does not cause an offsetting decrease in other properties of polycarbonate, but preferably improves those properties.

In 66 *Modern Plastics* at page 122 (January 1989), the use of Anoxsyn TM 442 bis alkyl sulfide as an antioxidant for olefin polymers is described. However, no mention is made therein of using Anoxsyn TM 442 bis alkyl sulfide in conjunction with polycarbonates, no mention is made of using Anoxsyn TM 442 bis alkyl sulfide for the purpose of overcoming the problem of the unwanted adhesion of a molded article to a mold, and the detailed chemical composition of the substance being sold at that time under that trade name is not set forth.

SUMMARY OF THE INVENTION

This invention involves a polycarbonate composition having an anti-adhesion additive, which composition is formed by admixing polycarbonate with an aliphatic thio compound described by the formula $C_aH_{2a+1}$—S—R—S—$C_bH_{2b+1}$, where a is independently an integer from 4 to 30 inclusive, b is independently an integer from 4 to 30 inclusive, R is a chain or cyclic hydrocarbon radical represented by either $C_dH_{2d}$ or $C_gH_{2g-2}$, and d or g is independently an integer from 3 to 12 inclusive. This invention also involves a method of molding an article of polycarbonate comprising molding the polycarbonate in the presence of an effective amount of an anti-adhesion additive admixed therewith. Yet another aspect of this invention is an article, molded from a composition containing polycarbonate and an anti-adhesion additive, which is substantially free of surface defects caused by adhesion to a mold.

It has been found that the occurrence of surface defects, in articles molded from polycarbonate under high speed injection molding conditions, is prevented by molding such articles from a polycarbonate composition formed by admixing with the polycarbonate, as an anit-adhesion additive, an effective amount of an aliphatic thio compound. Surprisingly, the aliphatic thio compound appears to function as an anti-adhesion additive, promotes clean release of the molded article from a mold without adhesion thereto, and protects the molded article from the surface defects caused by adhesion of such article to a mold. It has further been found that such aliphatic thio compound has other desirable effects on polycarbonate with respect, for example, to properties such as the color and hydrolytic stability thereof.

The compositions of this invention are useful, for example, in the production of films, fibers and molded or shaped articles of virtually all varieties, especially appliance and instrument housings and components for use in the automotive and electronics industries.

DETAILED DESCRIPTION OF THE INVENTION

The compositions which are the subject of this invention are those wherein an aliphatic thio compound has been admixed with polycarbonate.

The polycarbonate used in this invention can be derived from aliphatic dihydroxy compounds, including diols such as ethylene glycol, or aromatic dihydroxy compounds, including diols such as Bisphenol-A, Bisphenol-AP and Tetrabromo Bisphenol-A. If an aliphatic dihydroxy compound is employed, it will react readily with a carbonic acid derivative, including carbonyl halides such as phosgene, to form a hydroxy-substituted alkyl formic ester, or a bisalkyl formic ester. A bis formic ester of an aliphatic dihydroxy compound can be used in the reaction instead of a carbonic acid derivative, especially where a different dihydroxy compound is used as this will form a polycarbonate copolymer. The reaction of an aliphatic dihydroxy compound and a carbonic acid derivative proceeds rapidly at room temperature or at temperatures as low as 0° C. Aliphatic dihydroxy compounds with —OH groups separated by 4 or fewer carbon atoms tend to form, from the hydroxy-substituted alkyl formic ester, a significant amount of cyclic carbonate. The continued reaction of an aliphatic hydroxy compound with hydroxy-substituted alkyl formic esters to yield higher polycarbonates will not proceed without temperatures in excess of 50° C., and temperatures at such level promote various side reactions which place water in the reaction system. Water hinders the formation of polycarbonate because it hydrolyzes carbonic acid derivatives and hydroxy-substituted alkyl formic esters at rates faster than they react with an aliphatic dihydroxy compound.

To obtain higher polycarbonate from aliphatic dihydroxy compounds at low temperatures, a tertiary amine such as pyridine or dimethyl aniline is placed in the reaction system. By forming an adduct with the carbonic acid derivatives and hydroxy-substituted alkyl formic esters, the amine has the catalytic effect of increasing their reactivity with the dihydroxy compound to a level greater than that when the reaction is first initiated. The reaction is typically run in an inert organic solvent, such as toluene or xylene, and as the polycarbonate product forms it creates a highly viscous solution. When formation of the polycarbonate is complete, the reaction mixture is washed with an aqueous solution of a mineral acid to convert any remaining amine to its corresponding salt, and the organic phase is washed further with water to remove acidic electrolytes. The aqueous phase containing the acidic wash is separated from the organic phase containing the polycarbonate product. The solvent can be removed from the organic phase by distillation. Alternatively, the polycarbonate may be precipitated by a non-solvent such as petroleum ether, or methanol, isopropanol or other aliphatic hydrocarbon. The polycarbonate will separate from solution in crystalline form as a powder which can be filtered off and dried.

Aliphatic polycarbonates are also readily prepared by the transesterification of aliphatic dihydroxy compounds with diaryl esters. To obtain a polycarbonate rather than a cyclic carbonate, it is generally necessary to use a dihydroxy compound in which the hydroxy groups are separated by at least three carbon atoms. This reaction will proceed without catalysts at a temperature of about 180°–200° C. The use of dialkyl esters instead of diaryl esters is not feasible in the absence of high temperature and catalytic conditions which prevent the fully effective performance of both the dihydroxy compound and the dialkyl ester. Polycarbonate can also be formed from the polycondensation of bisaryl esters of aliphatic dihydroxy compounds, or by the polymerization of cyclic carbonates of aliphatic dihydroxy compounds, with more than five carbon atoms in the ring, by heating in the presence of an alkaline catalyst to assist in the ring opening.

Even with the application of heat, the direct contact of an aromatic dihydroxy compound and a carbonic acid derivative does not produce a reaction with a rate sufficient to form polycarbonate. As is true of the formation of aliphatic polycarbonate, the reaction of aromatic dihydroxy compounds with a carbonic acid derivative is facilitated by the presence in the reaction mixture of pyridine or another tertiary amine. The salt-like adduct of the carbonic acid derivative which is formed with the amine reacts much more favorably with the dihydroxy compound than the carbonic acid derivative itself. The reaction should be carried out in the absence of water, and a nonreactive organic solvent is used which will keep the polycarbonate product in a viscous solution as it forms. The non-reactive solvent is frequently methylene chloride or another halogenated hydrocarbon, or benzene or toluene. When the formation of polycarbonate is complete, the reaction mixture is washed with an aqueous solution of a mineral acid to convert any remaining amine to its corresponding salt, and the organic phase is washed further with water to remove acidic electrolytes. The aqueous phase containing the acidic wash is separated from the organic phase containing the polycarbonate product. The solvent can be removed from the organic phase by distillation. Alternatively, the polycarbonate may be precipitated from the organic phase by a non-solvent such as petroleum ether, or methanol, isopropanol or other aliphatic hydrocarbon. The polycarbonate will separate in crystalline form as a powder which can be filtered off and dried. This process has the advantage of being carried out in a homogenous liquid phase at low temperature, but recovery of the pyridine and solvent is undesirable from the standpoint of both process mechanics and economics.

At temperatures as low as from 0° C. to 40° C., carbonic acid derivatives react at a much better rate with deprotonated aromatic dihydroxy compounds than they do with aliphatic dihydroxy compounds. Although hydrolization of carbonic acid derivatives, and of hydroxy-substituted aryl formic esters, can still occur, the favorableness of the reaction between deprotonated aromatic dihydroxy compounds and carbonic acid derivatives allows the reaction to be run in an aqueous system. A solution is formed of (1) an aromatic dihydroxy compound and a strong base in aqueous phase, and (2) an inert, immiscible organic solvent which will dissolve both the carbonic acid derivative and the polycarbonate product. Solvents such as xylene or methylene chloride or other chlorinated hydrocarbons are suitable for such purpose. Caustic such as the the alkali or alkaline earth carbonates, oxides or hydroxides function best as the base, the total amount of which may be added at the beginning of, or incrementally during, the reaction. A pH of about 10 is typically maintained throughout the reaction. The base forms the dianion of the aromatic dihydroxy compound in the aqueous phase, and the aqueous phase forms a continuous phase with the organic solvent dispersed, upon agitation, as droplets therein. Carbonic acid derivative is bubbled into this mixture, is dissolved in the organic solvent, and reacts with the aromatic dihydroxy compound at the interface of the droplets with the aqueous phase. Any tendency of the carbonic acid derivative to be hydrolized can be overcome by the addition of excess caustic and carbonic acid derivative. Hydroxy-substituted aryl formic esters are formed by the attack of the dianion on the carbonic acid derivative, and catalysts accelerate the rate of the reaction sufficiently to allow the formation of high polycarbonates at the same low temperature at which the reaction began. Suitable catalysts for such purpose are tertiary amines such as triethylamine or N,N-dimethyl-cyclohexylamine, or quaternary ammonium bases such as tetramethyl ammonium hydroxide or triethyl benzyl ammonium hydroxide, or quaternary phosphonium, quaternary arsenium or tertiary sulfonium compounds. As is true of production of polycarbonate from an aliphatic dihydroxy compound, a bisaryl ester can be used in place of a carbonic acid derivative.

As the formation of polycarbonate swells the droplets, they tend to coalesce into a dough, and viscosity of the reaction mixture is maintained by addition of solvent as necessary. After separation of the organic from the aqueous phase, the organic phase is washed with an aqueous solution of a mineral acid to neutralize any alkalinity remaining in the organic phase, and then is washed with pure water to remove any electrolytes remaining from the acid wash. If the polycarbonate is to be used for the production of films or fibers, it can be used for such purpose in the solution state existing after completion of the production process, with any necessary adjustments to viscosity being performed by distillative removal of solvent or by addition of further solvent. However, if the polycarbonate is to be used in molding operations, it is typically recovered as a solid, and this can be accomplished by evaporation of the solvent as the polycarbonate is processed in an extruder. Alternatively, the polycarbonate may be precipitated from the organic phase by a non-solvent such as petroleum ether, or methanol, isopropanol or other aliphatic hydrocarbon. The polycarbonate will separate in crystalline form as a powder which can be filtered off and dried. However, polycarbonate with a limited crystallization tendency will only form a swollen liquid phase upon addition of the precipitant. If a minimum of solvent is purposely used to dissolve the polycarbonate product in the organic phase, the product will form as a viscous dough, which after aging becomes a solid, friable gel which can be readily reduced in size by mechanical means. The solvent can then be removed from the granules by evaporation or steam stripping.

Polycarbonate can additionally be made by transesterification, which is accomplished by reacting a dihydroxy compound with a bis carbonic acid ester. A strongly alkaline catalyst such as the alkali metals and the alkaline earth metals and their oxides, hydrides or amides, or the basic metal oxides such as zinc oxide, lead oxide and antimony oxide is used as an accelerator, and the reaction is run at temperatures of between 150° C. and 300° C., using vacuum to remove the residue of the bis carbonic acid ester. At temperatures between 150° C. and 200° C., low molecular weight polycarbonate terminated with bis carbonic acid ester groups is formed, which can then interact at temperatures above 250° C. to form higher weight polycarbonate by splitting off the original bis carbonic acid ester. This process is carried out at reduced pressure. Since no solvent is used, the polycarbonate product is obtained in dry form ready for direct pelletizing and packaging; however, precisely because of the absence of solvent in the reaction system, the product becomes very viscous and hard to process at a relatively low molecular weight.

The carbonate polymers employed in the present invention can include, for example, aromatic carbonate polymers such as the trityl diol carbonates described in U.S. Pat. Nos. 3,036,036, 3,036,037, 3,036,038 and 3,036,039; polycarbonates of bis (ar-hydroxyphenyl)alkylidenes (often called Bisphenol-A type diols), including their aromatically and aliphatically substituted derivatives such as disclosed in U.S. Pat. Nos. 2,999,835, 3,028,365, 3,334,154 and 4,299,928; the ester/carbonate copolymers of the types described in U.S. Pat. Nos. 4,287,787, 4,156,069, 4,260,731 and 4,105,633; carbonate polymers derived from other aromatic diols such as described in U.S. Pat. No. 3,169,121; and carbonate polymers based on dihydroxy benzenes such as pyrocatechol, resorcinol and hydroquinone (and their halo- and alkyl-substituted derivatives), and on dihydroxy naphthalenes and anthracenes.

The carbonate polymers used herein can also be derived from two or more different dihydric phenols, or one or more dihydric phenols and one or more acid- or hydroxy-terminated reactants, such as dicarboxylic acids or alkylene glycols, in the event a carbonate copolymer or interpolymer rather than a homopolymer is desired. Also suitable for the practice of this invention are blends of more than one of the above-mentioned carbonate polymers. Of the aforementioned carbonate polymers, the polycarbonates of Bisphenol-A and derivatives, including co-polycarbonates of Bisphenol-A, are preferred, Bisphenol-A and some of its derivatives being more particularly described below, to-wit:

2,2-bis(4-hydroxyphenyl)propane ("Bisphenol-A" or "Bis-A")

1,1-bis(4-hydroxyphenyl)-1-phenyl ethane ("Bisphenol-A-P" or "Bis-A-P")

2,2-bis(3,5-dibromo-4-hydroxyphenyl)propane ("Tetrabromo Bisphenol-A")

2,2-bis(3,5-dimethyl-4-hydroxyphenyl)propane ("Tetramethyl Bisphenol-A").

The methods generally described above for preparing carbonate polymers suitable for use in the practice of this invention are well known; for example, several methods are disclosed in the aforementioned patents, and in Moyer, U.S. Pat. No. 2,970,131 (Union Carbide); Schnell, U.S. Pat. No. 3,028,365 (Bayer AG); Campbell, U.S. Pat. No. 4,384,108 (GE); Glass U.S. Pat. No. 4,529,791 (Dow); and Grigo, U.S. Pat. No. 4,677,162 (Mobay), each of which is hereby incorporated as a part hereof.

The aliphatic thio compounds used in this invention are described generally by the formula $C_aH_{2a+1}$—S—R—S—$C_bH_{2b+1}$, where a is independently an integer from 4 to 30 inclusive, b is independently an integer from 4 to 30 inclusive, R is a chain or cyclic hydrocarbon radical represented by either $C_dH_{2d}$ or $C_gH_{2g-2}$, and d or g is independently an integer from 3 to 12 inclusive. A preferred aliphatic thio compound is $C_{18}H_{37}$—S—$C_8H_{14}$—S—$C_{18}H_{37}$.

Although a compound which fits the above formula is available commercially from Pennwalt Corporation as Anoxsyn TM 442 bis alkyl sulfide, aliphatic thio compounds described generally by the above formula can be made by reacting a dichloride, Cl—R—Cl, with the mercaptans $R^1$—SH and $R^2$—SH, where R is as set forth above, $R^1$ is $C_aH_{2a+1}$, $R^2$ is $C_bH_{2b+1}$, and a and b are as set forth above. The dichloride, which can be derived from the corresponding dialcohol, is heated, if necessary, to liquid phase, and the reaction can be run at that temperature. Otherwise, the reaction can be run at ambient temperature. The reaction can also be run in the presence of a solvent such as benzene.

The admixture of an aliphatic thio compound with polycarbonate can be accomplished by any suitable means known in the art. Typically the aliphatic thio compound and polycarbonate are dry blended with sufficient agitation to obtain thorough distribution of the aliphatic thio compound within the polycarbonate. If desired, the dry-blended formulation can further, but need not, be melt mixed in an extruder, and the extrudate comminuted into pellets. The pellets can again be heated in a molding machine and shaped into whatever articles are desired. However, mixing rolls, dough-mixers and Banbury mixers can also be used for such purpose, and the compositions can be formed or molded using compression, injection, calendering, vacuum forming, extrusion and/or blow molding techniques, alone or in combination. The compositions can also be formed into films or fibers on any machine suitable for such purpose. Additionally, an aliphatic thio compound can be admixed with polycarbonate during the reaction which yields polycarbonate product by adding the aliphatic thio compound to the solution in which the polycarbonate is formed prior to its recovery therefrom.

For the purpose of this invention, an aliphatic thio compound is admixed with polycarbonate in an effective amount, usually about 0.005 wt. % to about 2.0 wt. %, and preferably in the amount of about 0.010 wt. % to about 0.500 wt. %, based on the weight of the polycarbonate. A master batch formulation containing polycarbonate and the anti-adhesion additive can also be prepared in virtually any proportion, e.g. 80 wt. % anti-adhesion additive. The master batch is then available for storage or shipment in commerce, and can be diluted with polycarbonate at the time of use.

The tendency in certain instances of articles such as a compact disc to show surface defects, when molded from polycarbonate under high speed injection molding conditions, is relieved by molding such articles from a polycarbonate composition formed by admixing an effective amount of an aliphatic thio compound with the polycarbonate. The aliphatic thio compound of this invention appears to function as an anti-adhesion additive, promotes clean release of the molded article from a mold without adhesion thereto, and allows production of articles molded from polycarbonate which are free, or substantially free, of the surface defects caused by adhesion of such article to a mold. The aliphatic thio compound has other desirable effects on polycarbonate with respect, for example, to properties such as the color and hydrolytic stability thereof.

It is desirable, but not necessary, to utilize a mold release, such as glycerol tristearate ("GTS"), and a hindered phenol, such as Irganox TM 259 hindered phenol, in the composition formed by admixing an aliphatic thio anti-adhesion additive with polycarbonate. These added substances would typically be present in an amount of about 10 to about 1,000 ppm based on the weight of the polycarbonate.

Admixing an aliphatic thio compound with polycarbonate, to form a polycarbonate composition, is a method of preventing an article molded from such composition from adhering to, and failing to cleanly release from, a mold: and is also a method of protecting an article molded from such composition from the occurrence of surface defects caused by such adhesion to a mold.

The polycarbonate compositions of this invention containing an aliphatic thio compound anti-adhesion additive can also include, if desired, coloring agents, fire retardants, fillers, impact modifiers, and the like.

To illustrate the practice of this invention, examples of preferred embodiments are set forth below. It is not intended, however, that these examples (Examples 1 and 2) should in any manner establish or limit the scope of this invention. Some of the particularly desirable features of this invention may be seen by contrasting the properties of Examples 1 and 2 with those of Controls 1–7, which are not embodiments of this invention.

The weight-average molecular weight, $M_w$, of the polycarbonate used in this invention is calculated from the specific viscosity, $\eta_{sp}$, which was measured at 20° C. using a methylene chloride solution of 6.0 grams/liter of the polycarbonate resin, according to the following formulae $$\eta_{sp}/C = [\eta](1 + 0.28\,\eta_{sp})$$

wherein C represents the concentration of the polycarbonate resin in grams/liter, $[\eta]$ is its intrinsic viscosity, a is 0.83 and $[\eta] = 1.23 \times 10^{-5} M_w^a$.

EXAMPLE 1

During the preparation of a Bisphenol-A polycarbonate having a weight-average molecular weight of 18,000, (a) 500 ppm of Anoxsyn TM 442 bis alkyl sulfide, (b) 100 ppm of 1,6-hexamethylene bis(3,5-di-tert-butyl-4-hydroxyhydrocinnamate) ["Irganox TM 259 hindered phenol"], and (c) 500 ppm of GTS are added to the solution in which the polycarbonate has been formed prior to its recovery therefrom (the ppm of each component being based on the weight of the polycarbonate). After recovery of the polycarbonate from solution, the polycarbonate is used to mold compact discs on a Nestel molding machine at 630° F. Each finished disc is visually examined for defects in the surface, or "stick marks", caused by adhesion of the disc to the mold during release.

Control 1

The procedure of Example 1 is repeated except that 500 ppm of trinonaphenyl phosphite ("TNPP") is added to the solution in which the polycarbonate has been formed instead of Anoxsyn TM 442 bis alkyl sulfide, and no Irganox TM 259 hindered phenol is added.

Control 2

The procedure of Example 1 is repeated except that 500 ppm of tri(2,4-di-t-butylphenyl) phosphite ("P-168") is added to the solution in which the polycarbonate has been formed instead of Anoxsyn TM 442 bis alkyl sulfide, and no Irganox TM 259 hindered phenol is added.

Control 3

The procedure of Example 1 is repeated except that 500 ppm of tetrakis (2,4-di-tert-butylphenyl) 4,4'-biphenylene diphosphonite ("PEPQ") is added to the solution in which the polycarbonate has been formed instead of Anoxsyn TM 442 bis alkyl sulfide, and no Irganox TM 259 hindered phenol is added.

The results of the visual examination of the discs produced by the procedures of Example 1 and Controls 1–3 show that, despite the presence of the GTS, the discs molded from polycarbonate admixed with phosphorous-based compounds such as TNPP, P-168 or PEPQ (as opposed to a sulfur-based compound) had surface defects, or stick marks, indicating that said discs adhered to, and failed to release cleanly from, the mold during release. On the contrary, a sulfur-based compound such as Anoxsyn TM 442 bis alkyl sulfide performed well as an anti-adhesion additive. This can be seen from the fact that the discs molded from polycarbonate which was admixed with Anoxsyn TM 442 bis alkyl sulfide had no surface defects, or stick marks, indicating they were cleanly released from the mold without adhesion thereto.

EXAMPLE 2

A Bisphenol-A polycarbonate having a weight-average molecular weight of 33,000 is dry blended with 700 ppm of Anoxsyn TM 442 bis alkyl sulfide and 1,000 ppm of epoxidized soy bean oil, used as a dispersion agent, the measurement of ppm being based on the weight of the polycarbonate. The blended material is extruded at 275° C. into pellets, which are then dried for three hours at 125° C., and the pellets are then molded into test discs at 310° C. The yellowness index ("YI") of a disc is measured, and, after being aged in an autoclave for 24 hours at 125° C. and at 21 psi (0.145 MPa), the haze percent of another disc is measured, both according to ASTM Designation D 1925-70.

Control 4

The procedure of Example 2 is repeated except that nothing is admixed with the polycarbonate.

Control 5

The procedure of Example 2 is repeated except that 700 ppm of PEPQ is admixed with the polycarbonate instead of the Anoxsyn TM 442 bis alkyl sulfide.

Control 6

The procedure of Example 2 is repeated except that 700 ppm of TNPP is admixed with the polycarbonate instead of the Anoxsyn TM 442 bis alkyl sulfide.

Control 7

The procedure of Example 2 is repeated except that 700 ppm of distearyl thiodipropionate ("DSTDP") is admixed with the polycarbonate instead of the Anoxsyn ™ 442 bis alkyl sulfide.

The additive used in each test sample, and the results of the yellowness and haze percent tests run, are reported below in Table I for Example 2 and Controls 4–7.

TABLE I

|  | Additive | YI | Haze % |
|---|---|---|---|
| Example 2 | Anoxsyn ® 442 bis alkyl sulfide | 2.7 | 8.5 |
| Control 4 | — | 4.5 | 10.5 |
| Control 5 | PEPQ | 2.7 | 15.8 |
| Control 6 | TNPP | 3.0 | 33.7 |
| Control 7 | DSTDP | 3.0 | 9.9 |

The results of the yellowness and haze percent tests run in Example 2 and Controls 4–7 show that, while phosphorous-based compounds such as PEPQ or TNPP not only fail to cause an article molded from polycarbonate to release cleanly from a mold without adhesion and the attendant stick marks, they are undesirable for other reasons as well. While they are capable of lowering the YI of polycarbonate, the phosphorous-based compounds undesirably increase its haze percent, which indicates that the hydrolytic stability of the polycarbonate has been detrimentally affected. On the contrary, it can be seen that the sulfur-based compounds used in Example 2 and Control 7 both improved both the YI and haze percent of polycarbonate, with the greatest improvement being attained from an aliphatic thio compound such as Anoxsyn ™ 442 bis alkyl sulfide, as opposed to DSTDP, which contains ester functionalities. Anoxsyn ™ 442 bis alkyl sulfide was present in Example 2 in an amount effective to measurably reduce the yellowness index and haze percent of said composition as compared to Control 4 - polycarbonate not admixed with said additive.

What is claimed is:

1. A composition of matter comprising, in admixture, a carbonate polymer and an amount of an aliphatic thio compound,
   described by the formula
   $C_aH_{2a+1}$—S—R—S—$C_bH_{2b+1}$, where a is independently an integer from 4 to 30 inclusive, b is independently an integer from 4 to 30 inclusive, R is a chain or cyclic hydrocarbon radical represented by either $C_dH_{2d}$ or $C_gH_{2g-2}$, and d or g is independently an integer from 3 to 12 inclusive,
effective to protect an article molded from said composition from the occurrence of surface defects caused by adhesion of such article to a mold, or (b) reduce the yellowness index and haze percent of said composition, as measured by ASTM Designation D 1925-70, as compared to polycarbonate not admixed with said aliphatic thio compound, or (c) accomplish both said items (a) and (b).

2. The composition of claim 1 wherein said aliphatic thio compound is present in said composition in the amount of about 0.005 wt. % to about 2.0 wt. %, based on the weight of the polycarbonate.

3. The composition of claim 1 wherein said aliphatic thio compound is present in said composition in the amount of about 0.010 wt. % to about 0.500 wt. %, based on the weight of the polycarbonate.

4. The composition of claim 1 further comprising glycerol tristearate and 1,6-hexamethylene bis(3,5-di-tert-butyl-4-hydroxyhydrocinnamate), in an amount about 10 to about 1,000 ppm based on the weight of the polycarbonate, in admixture with said polycarbonate and said aliphatic thio compound.

5. The composition of claim 1 wherein said aliphatic thio compound is $C_{18}H_{37}$—S—$C_8H_{14}$—S—$C_{18}H_{37}$.

6. The composition of claim 1 in the form of a molded article.

7. The molded article of claim 6 which is free, or substantially free, of surface defects caused by adhesion to a mold.

8. The molded article of claim 7 which is a compact disc.

9. An article, molded from a composition comprising, in admixture, polycarbonate and an aliphatic thio compound as described in claim 1, which is free, or substantially free, of surface defects caused by adhesion to a mold.

10. An article, molded from a composition comprising, in admixture, polycarbonate and an aliphatic thio compound as described in claim 1, having a yellowness index and haze percent, as measured by ASTM Designation D 1925-70, which are lower than that of polycarbonate not admixed with such a compound.

11. An article, molded from polycarbonate, which is protected by an aliphatic thio compound, as described in claim 1, from the occurrence of surface defects caused by adhesion of such article to a mold.

12. A method of protecting an article molded from polycarbonate from the occurrence of surface defects caused by adhesion of such article to a mold, comprising the steps of forming a composition by admixing polycarbonate with an aliphatic thio compound, as described in claim 1, and molding said article from said composition.

13. A method of molding an article from polycarbonate comprising molding polycarbonate in the presence of an amount of an aliphatic thio compound, as described in claim 1, admixed therewith effective to (a) protect an article molded from said composition from the occurrence of surface defects caused by adhesion of such article to a mold, or (b) reduce the yellowness index and haze percent of said composition, as measured by ASTM Designation D 1925-70, as compared to polycarbonate not admixed with said aliphatic thio compound, or (c) accomplish both said items (a) and (b).

14. An article, molded from a composition comprising, in admixture, polycarbonate and an aliphatic thio compound as described in claim 1, which releases cleanly without adhesion to a mold.

15. A method of promoting clean release from a mold of an article molded from polycarbonate, comprising the steps of forming a composition by admixing polycarbonate with an aliphatic thio compound as described in claim 1, molding said article from said composition, and releasing said article from said mold.

16. A method of producing an article molded from polycarbonate which is free, or substantially free, of surface defects caused by adhesion of said article to a mold, comprising the steps of forming a composition by admixing polycarbonate with an aliphatic thio compound as described in claim 1, and molding said article from said composition.

17. A method of reducing the yellowness index and haze percent of polycarbonate, as measured by ASTM Designation D 1925-70, comprising admixing polycarbonate with an aliphatic thio compound as described in claim 1.

18. The composition of claim 1 wherein the carbonate polymer is an aromatic carbonate polymer.

19. The composition of claim 1 in dry blended form.

20. The composition of claim 1 in the form of a melt mixed extrudate.

* * * * *